(12) United States Patent
Hong

(10) Patent No.: US 11,858,412 B1
(45) Date of Patent: Jan. 2, 2024

(54) GRILL LIGHTING LAMP SYSTEM WITH STEPPED REFLECTION AND INVALID PORTIONS

(71) Applicants: HYUNDAI MOTOR COMPANY, Seoul (KR); KIA CORPORATION, Seoul (KR)

(72) Inventor: Seung-Pyo Hong, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/115,531

(22) Filed: Feb. 28, 2023

(30) Foreign Application Priority Data

Sep. 13, 2022 (KR) .................. 10-2022-0114659

(51) Int. Cl.
*B60Q 1/28* (2006.01)
*B60R 19/52* (2006.01)
*F21S 41/33* (2018.01)

(52) U.S. Cl.
CPC ............. *B60Q 1/28* (2013.01); *B60R 19/52* (2013.01); *F21S 41/33* (2018.01)

(58) Field of Classification Search
CPC ...... B60R 19/52; B60R 2019/525; B60Q 1/28
See application file for complete search history.

(56) References Cited

U.S. PATENT DOCUMENTS

| | | | |
|---|---|---|---|
| 10,870,404 B2 * | 12/2020 | Dickson | ............... B60R 13/04 |
| 11,415,295 B2 | 8/2022 | Lee | |
| 11,441,751 B2 | 9/2022 | Ahn et al. | |
| 11,525,551 B1 * | 12/2022 | Choi | ................. F21S 43/14 |
| 2021/0381673 A1 | 12/2021 | Lee | |
| 2022/0107071 A1 | 4/2022 | Ahn et al. | |
| 2022/0268415 A1 | 8/2022 | Ahn et al. | |

FOREIGN PATENT DOCUMENTS

KR          102390805 B1    4/2022
KR     20220045865 A    4/2022

* cited by examiner

*Primary Examiner* — Robert J May
(74) *Attorney, Agent, or Firm* — LEMPIA SUMMERFIELD KATZ LLC

(57) ABSTRACT

The present disclosure relates to a grill lighting lamp system and includes a grill part provided in a vehicle and an optical device configured to irradiate light to the grill part. The grill part includes a plurality of reflection portions configured to reflect the light irradiated from the optical device toward the outside of the vehicle and an invalid portion provided in a stepped shape between the plurality of reflection portions and configured to absorb glare light not reflected forward among light incident on the reflection portion from the optical device. According to the present disclosure, it is possible to minimize damage to the optical device in the event of a front collision of the vehicle and suppress a glare phenomenon from occurring upon grill lighting.

20 Claims, 20 Drawing Sheets

GRILL LIGHTING LAMP SYSTEM WITH STEPPED REFLECTION AND INVALID PORTIONS

CROSS-REFERENCE TO RELATED APPLICATION

This application claims priority to Korean Patent Application No. 10-2022-0114659, filed on Sep. 13, 2022, the entire contents and disclosure of which is incorporated herein by reference in its entirety.

BACKGROUND OF THE DISCLOSURE

Technical Field

The present disclosure relates to an exterior lamp system applied to a vehicle, and particularly, to a grill lighting lamp system which may illuminate a grill provided on a front portion of the vehicle.

Description of Related Art

Lighting devices using various light sources are applied to a vehicle, and each lighting device is suitably used according to its characteristics depending on an installation location and a use purpose.

The lighting device may include an indoor lighting lamp installed in the vehicle or a headlamp, a fog lamp, a back-up lamp, a side lamp, a license plate lamp, a tail lamp, a brake lamp, a turn indicator lamp, and an emergency flashing lamp installed outside the vehicle.

In particular, since lighting devices installed outside the vehicle contribute to the advancement of products even in terms of design, the lighting design and lighting effect of the vehicle are also recently being considered as important.

In general, since lighting devices installed outside the vehicle focus on irradiating light forward or rearward, techniques have been mainly developed to secure the light concentration and diffusivity of light in the past. Recently, techniques for emphasizing the design aspect of the lighting are being developed.

As an example, there is a grill lighting technique as in Korean Patent Application Laid Open Publication No. 10-2022-0045865 (Apr. 13, 2022) (Patent Document 1). The grill lighting technique in Patent Document 1 is a technique of illuminating a front panel of a grill by arranging a lighting device therein in addition to forming a front panel of a grill with a light-transmitting material and turning on a light source provided in the lighting device.

According to the grill lighting technique as such, it is possible to illuminate the grill in various colors when the light source is turned on. For example, there is an advantage in that it is possible to give a sense of luxury to a vehicle design and implement a differentiated image by illuminating different colors whenever a welcome function, a charging function, or a music reproduction function is performed.

However, as described above, the conventional grill lighting technique as in Patent Document 1 is configured to include the light source inside the grill and have the light source and the front of the grill covered with a transparent lens, and thus has a structure in which the lens exposed toward the front is easily damaged in the event of a front or rear collision of the vehicle. Therefore, there is a problem in that the repair cost is excessive when collision accidents occur.

As another technique for emphasizing the design element of the vehicle exterior lighting, as in Korean Patent No. 10-2390805 (Apr. 26, 2022) (Patent Document 2), a micro lens array (MLA) including a plurality of micro lenses is applied to an optical device for lighting. The micro lens array is widely used in micro-optical fields, such as optical communication and direct optical imaging. In particular, the micro lens array has been recently used as a configuration of performing a welcome light function in vehicles due to the feature that a specific pattern may be drawn on a road surface through an optical system having a size of about 10 mm. Furthermore, as in Patent Document 2, an attempt has been made to apply the micro lens array technique to the headlamp of the vehicle.

However, in the technique adopting the micro lens such as MLA, glare is likely to be generated between the respective optics or modules due to unnecessary light. As a result, the glare is generated in a shaded section between patterns of light implemented by the lens.

As described above, the conventional grill lighting lamp system has a problem in that the lens arranged adjacent to the front grill cover is damaged in the event of the front collision of the vehicle, thereby increasing the repair cost. In addition, conventionally, when the micro lens array (MLA) is applied as the light source of the lamp, there is a problem in that glare is generated in a shaded portion between the patterns due to the light which is not reflected forward, thereby impairing the aesthetic sense.

SUMMARY OF THE DISCLOSURE

The present disclosure has been made in efforts to solve the problems of the related art. An object of the present disclosure is to provide a grill lighting lamp system that may decrease the repair cost when a grill of a vehicle is damaged and suppress the generation of glare upon grill lighting even while implementing the grill lighting.

In order to achieve the object, a grill lighting lamp system according to the present disclosure may include a grill part provided in a vehicle and an optical device configured to irradiate light to the grill part. The grill part may include a plurality of reflection portions configured to reflect the light irradiated from the optical device toward outside of the vehicle and an invalid portion provided in a stepped shape between the plurality of reflection portions and configured to absorb glare light not reflected forward among light incident on the reflection portion from the optical device.

The grill part may have the reflection portion and the portion in the form of a step-shaped structure so that a height of a protrusion to a front of the vehicle decreases as the grill part is closer to the optical device. In addition, the portion may be formed to be inclined at about 3° or more with respect to a direction in which light reflected by the reflection portion is directed.

The reflection portion and the portion may form a step-shaped structure so that a height of a protrusion to a front of the vehicle decreases as the grill part moves away from the optical device.

The portion may be formed with an opening so that outside air introduced toward the grill part from outside of the vehicle may pass through the grill part and may be introduced toward an inside of the vehicle. In addition, the grill lighting lamp system may further include a vortex generation portion extending toward a rear of the vehicle from the reflection portion so that a vortex may be generated in the outside air introduced through the opening formed in the portion.

An opening configured to guide outside air introduced toward the grill part from outside of the vehicle to be introduced toward an inside of the vehicle may be additionally formed between the optical device and the grill part.

The grill part may be formed to be inclined toward a rear of the vehicle from the front of the vehicle.

The optical device may be arranged above or below the grill part when viewing the vehicle from a side of the vehicle.

A reflected surface of the reflection portion may be configured in a chromatic color having a predetermined brightness or more or configured in an achromatic color to reflect the light.

A reflected surface of the reflection portion may be formed as a non-linear surface to diffusely reflect the light from the surface.

The optical device may include a light source configured to generate and emit light and a micro lens array (MLA) module provided on a front of the light source in a light irradiation direction and on which the light is incident.

The optical device may include a light source configured to generate and emit light and a multi-facet lens (MFL) provided on a front of the light source in a light irradiation direction and on which the light is incident.

The optical device may include a light source configured to generate and emit light and a multi-facet reflector (MFR) configured to reflect the light irradiated from the light source and irradiate the reflected light to the grill part.

The optical device may be a projection lamp.

An amount or color of light from the optical device may be set depending on a color of a reflected surface of the reflection portion of the grill part.

In the grill lighting lamp system according to the present disclosure, it is possible to implement an indirect light type grill lighting. Thus, it is possible to prevent the lens together with the grill from being damaged even when the grill of the vehicle is damaged by separating the optical system configured to irradiate light to the grill from the grill and arranging the optical system inside the body to be inclined from the front portion of the vehicle. Therefore, it is possible to decrease the repair cost when the vehicle is damaged.

In addition, according to the present disclosure, it is possible to prevent glare light from being reflected from the grill and irradiated to the front direction of the vehicle by providing an invalid portion in a stepped shape between the reflection portions of the grill constituting the grill lighting lamp system. Therefore, it is possible to suppress a glare phenomenon, thereby improving the aesthetic sense of the exterior lighting of the vehicle.

In addition, according to the present disclosure, it is possible to prevent the aerodynamic performance from being degraded by forming the opening through which outside air may pass at the appropriate position even while having the invalid portion in the stepped shape. Thus, the opening may be used for cooling the engine compartment. Therefore, it is possible to improve the heat resistance performance of the engine and improve the aerodynamic performance even while suppressing the generation of the glare.

In addition, according to the present disclosure, it is possible to suppress the occurrence of serious injuries in the event of a pedestrian collision by decreasing the protrusion amount of the grill even while including the invalid portion having the stepped shape.

In addition, according to the present disclosure, it is possible to allow vehicles approaching from the opposite direction or pedestrians around the vehicle to easily recognize the light from the illuminated grill by appropriately setting the angle of the reflection portion to which light is irradiated from the optical device.

DETAILED DESCRIPTION

Figure 1:
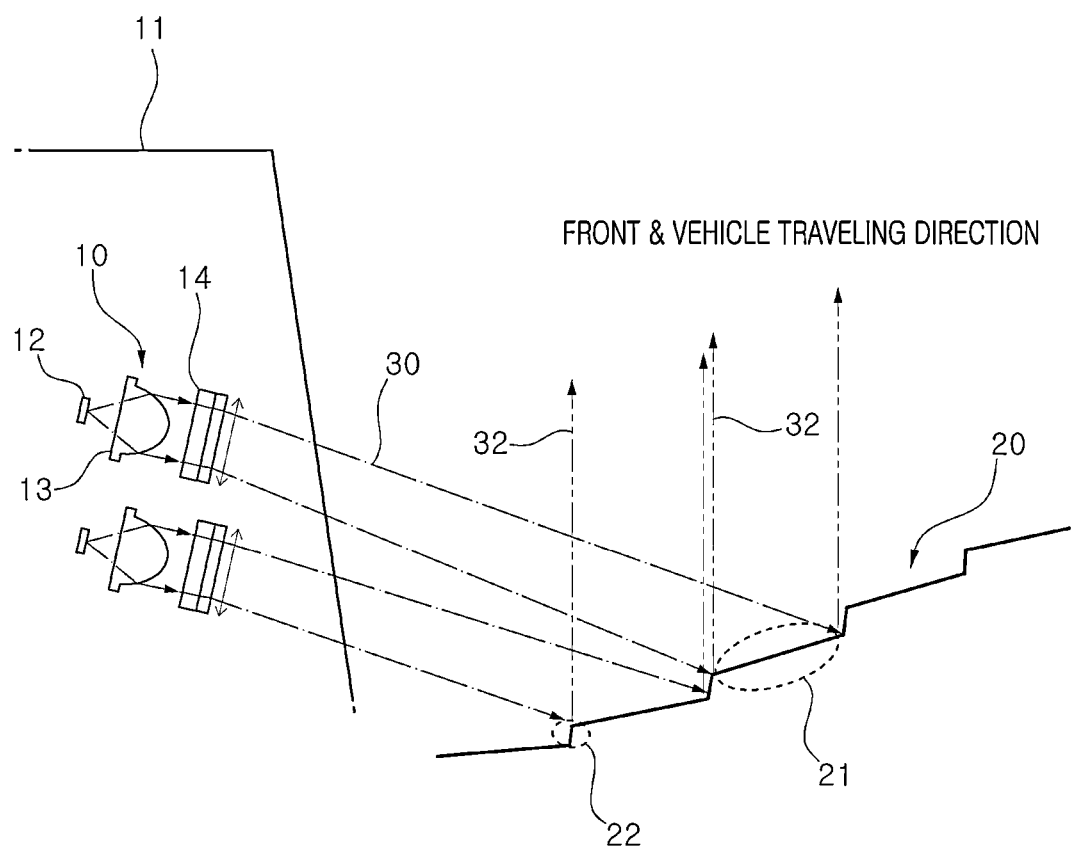
FIG. 1 is a cross-sectional view showing a grill lighting lamp system according to an embodiment of the present disclosure and a light reflection operation thereof.

Hereinafter, some embodiments of the present disclosure are described in detail with reference to the accompanying drawings. In adding reference numerals to the components of each drawing, it should be noted that the same components are given the same reference numerals as much as possible even though they are indicated on different drawings. In addition, in describing the embodiments of the present disclosure, when it is determined that a detailed description of a related known configuration or function interferes with the understanding of the embodiments of the present disclosure, a detailed description thereof has been omitted.

FIG. 1 is a cross-sectional view showing a grill lighting lamp system according to an embodiment of the present disclosure and a light reflection operation thereof. As shown in FIG. 1, a grill part 20 may have a shape inclined toward the inside in a vehicle width direction with respect to front and vehicle traveling directions. In this case, it is possible to prevent aerodynamic performance from being degraded by the grill part 20 by inducing the air introduced toward the grill part 20 toward the inside or outside of the rear of the vehicle when the vehicle travels. As described above, the grill part 20 may be installed on the front portion of the vehicle toward the front direction of the vehicle, but the present disclosure is not limited thereto. For example, as necessary, the grill part 20 may also be mounted in the vicinity of a rear lamp on the rear portion of the vehicle.

Referring to FIG. 1, the grill lighting lamp system according to an embodiment of the present disclosure may include an optical device 10 and the grill part 20 to which light is irradiated from the optical device 10.

The optical device 10 may include, for example, a light source 12 configured to generate light, such as a light-emitting diode (LED), a collimator lens 13 configured to refract light emitted from the light source 12 to generate parallel light as an incident-side lens, and an emission-side lens 14 through which the parallel light passes.

As shown in FIG. 1, the optical device 10 may be provided inside a housing 11 of the vehicle having an opened light output side. In addition, the optical device 10 may be arranged to face a direction inclined forward toward the grill part 20 and rearward with respect to the vehicle traveling direction. As described above, since the optical device 10 is arranged inside the housing 11, which is configured separately from the grill part 20, and since the optical device 10 including the lens 14 does not face the front of the vehicle, it is possible to suppress the optical device 10 including the expensive lens 14 from being damaged even when the grill part 20 is damaged in the event of a front collision accident of the vehicle.

Only two optical devices 10 are shown in FIG. 1, but the present disclosure is not limited thereto. For example, only one optical device 10 may be provided or three or more optical devices 10 may also be provided according to the shape of the grill part 20.

In addition, FIG. 1 shows that incident light 30 from one optical device 10 matches one reflection portion 21 among a plurality of reflection portions 21 of the grill part 20, but the present disclosure is not limited thereto. For example, one optical device 10 may include a plurality of pixels so that the incident light 30 from each pixel may match each one (i.e., a respective) reflection portion 21 of the grill part 20.

The grill part 20 may be positioned toward the front of the vehicle for aerodynamic and engine cooling or design elements of a front portion of the vehicle.

Figure 2:
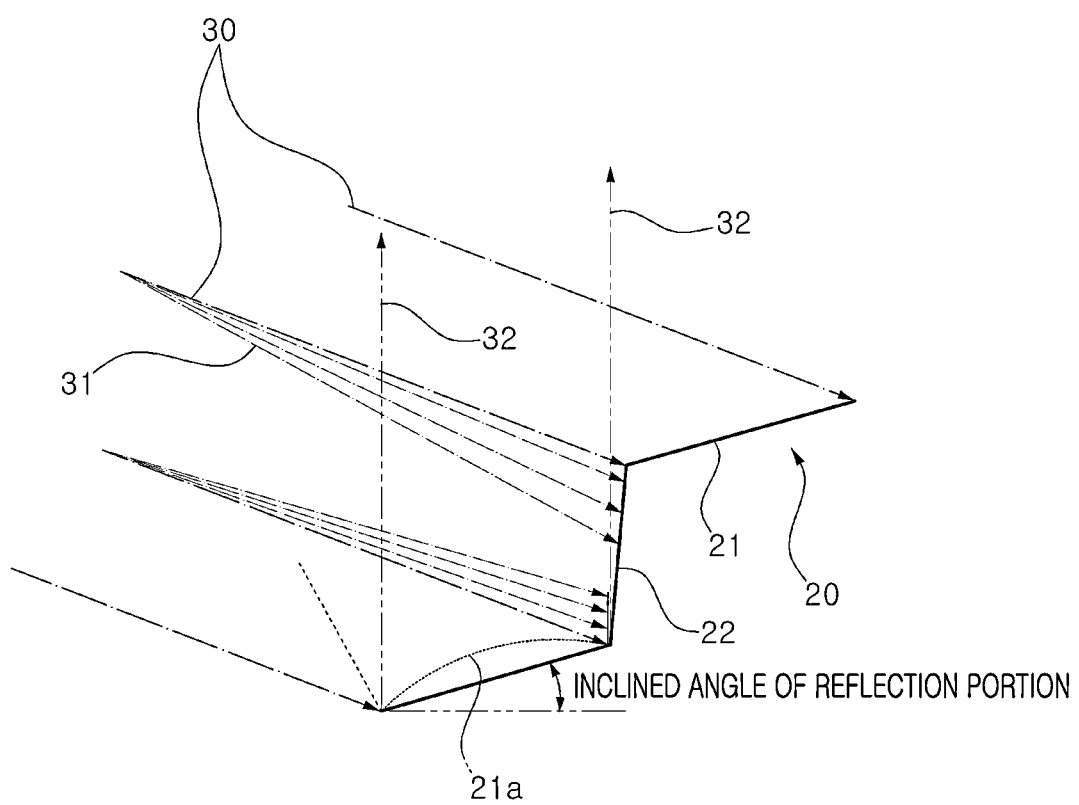
FIGS. 2 and 3 are cross-sectional views showing a grill constituting the grill lighting lamp system according to an embodiment of the present disclosure and the light reflection operation thereof.

Referring to FIGS. 1 and 2, the grill part 20 may include a plurality of reflection portions 21 configured to reflect the incident light 30 irradiated from the optical device 10 in the form of reflected light 32 toward the front of the vehicle. The grill part 20 may include a non-reflective portion also called a dummy reflective portion (referred to as "invalid portion 22" hereinafter) provided in a stepped shape between the plurality of reflection portions 21 to absorb glare light 31 that is unnecessary, i.e., not reflected forward among the incident light 30 on the plurality of reflection portions 21 from the optical device 10. In the embodiment shown in FIG. 1, the grill part 20 may have a plurality of reflection portions 21 provided in a stepped shape and the invalid portions 22 having the form of connecting between the plurality of reflection portions 21. In other words, the reflection portion 21 and the invalid portion 22 may be integrally formed. FIGS. 1 and 2 show that the plurality of reflection portions 21 reflect the irradiated incident light 30 toward the front of the vehicle, but the present disclosure is not limited thereto. For example, when the grill part 20 is installed around the rear lamp of the vehicle as described above, the plurality of reflection portions 21 may reflect the incident light 30 toward the rear of the vehicle.

Figure 3:
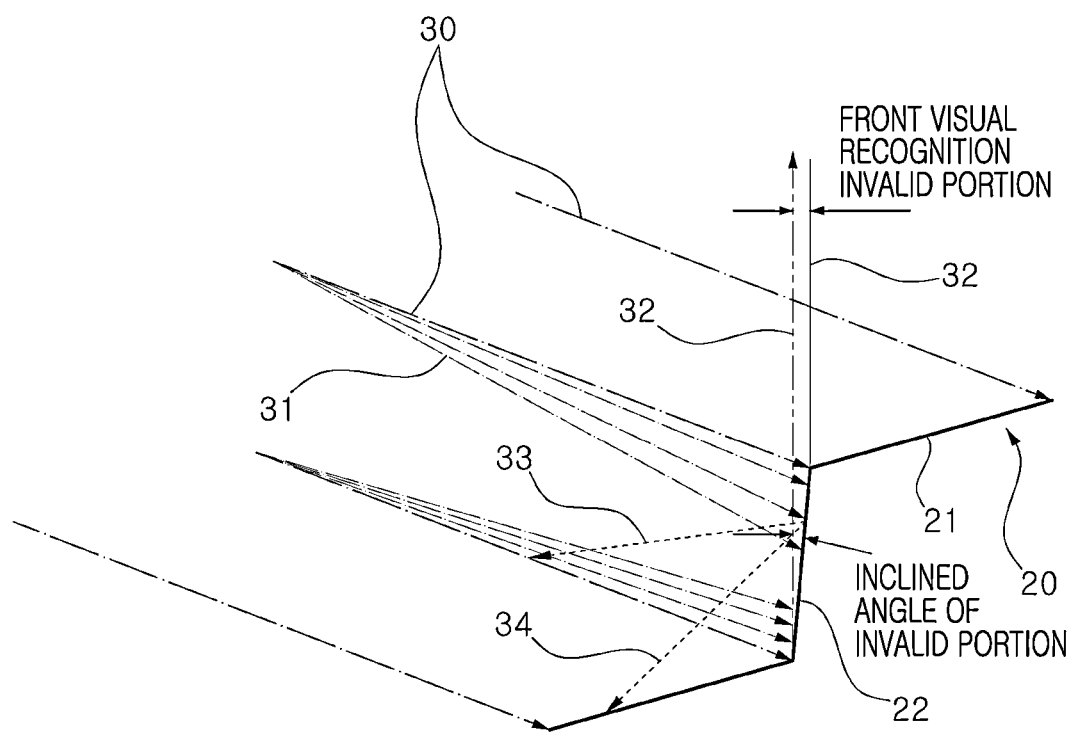

FIGS. 2 and 3 are cross-sectional views showing the grill part 20 constituting the grill lighting lamp system according to an embodiment of the present disclosure and a light reflection operation performed in the grill part 20.

As shown in FIGS. 2 and 3, the reflection portion 21 may be a bright color having high brightness, such as an achromatic color, in order to reflect the incident light 30. When it is difficult to configure the reflection portion 21 in the bright color due to the design element of the grill part 20, it is necessary to increase the amount of light from the optical device 10 to compensate for this. In addition, when it is difficult to configure the reflection portion 21 in the achromatic color for the same reason, it is necessary to match a reference color required for reflected light 32 by adjusting the color of the incident light 30 irradiated by the optical device 10.

An angle at which the reflection portion 21 is inclined with respect to the vehicle width direction is appropriately set so that the incident light 30 incident from the optical device 10 is reflected toward the front of the vehicle. In addition, as shown in FIG. 2, the reflection portion 21 may have a non-linear surface, for example, a convex shape toward the front so that the incident light 30 may be diffusely reflected from the surface thereof. To this end, as shown in FIG. 2, a convex portion 21a may be provided on a front surface of the reflection portion 21.

The invalid portion 22 may constitute a front visual recognition invalid portion for decreasing the influence of the glare light 31 so that an ambiguous boundary line caused by the glare light 31 may not be visually recognized from the front. In the example shown in FIG. 3, when viewed from the top of the vehicle, the invalid portion 22 is inclined at 3° or more with respect to a direction in which the reflected light 32 reflected by the plurality of reflection portions 21 is directed. Therefore, the glare reflected light 33 reflected from the surface of the invalid portion 22 may be reflected so as not to face the front of the vehicle unlike the reflected light 32, whereas the glare reflected light 33 is not reflected toward the reflection portion 21 of the grill part 20 (indicated by the light of reference numeral 34 in FIG. 3). According to the structure, the glare light 31 unnecessary for forward reflection among the incident light 30 may be reflected and removed by the invalid portion 22 so as not to be reflected forward, so that a plurality of patterns (pixels) formed by the reflected light 32 reflected by the reflection portion 21 of the grill part 20 is more clearly distinguished.

Figure 4:
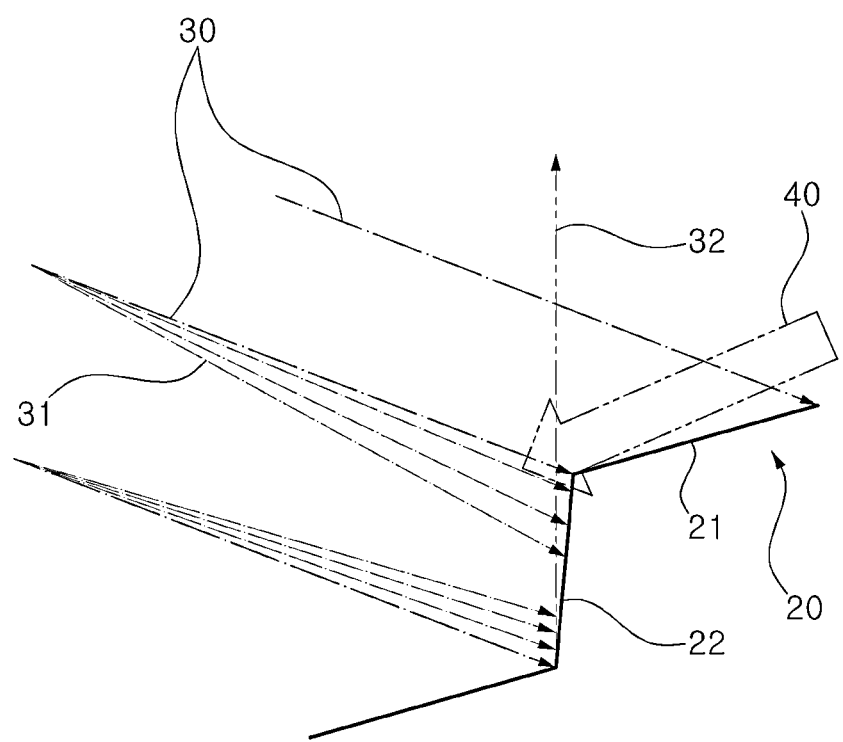
FIG. 4 is a cross-sectional view showing a flow of outside air on the grill constituting the grill lighting lamp system according to an embodiment of the present disclosure and a light reflection operation thereof.
Figure 5:
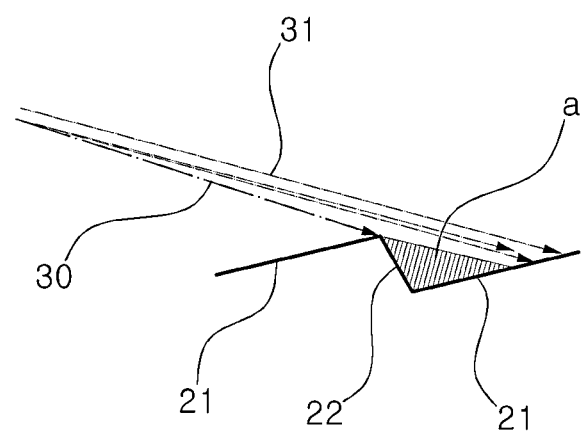
FIG. 5 is a view for describing a glare phenomenon occurring in the grill.

FIG. 4 is a cross-sectional view showing a flow of outside air on the grill constituting the grill lighting lamp system according to an embodiment of the present disclosure and a light reflection operation thereof. FIG. 5 is a view for describing a glare phenomenon occurring in the grill.

Referring to FIG. 4, the grill part 20 may have a structure in which the reflection portion 21 and the invalid portion 22 have the step-shaped structure so that a height of the grill part 20 decreases as the grill part 20 is closer to the optical device 10. In this case, as shown in FIG. 4, there is no step difference in the direction in which outside air 40 flows along the grill part 20, thereby improving the aerodynamic performance in the grill part 20. However, as another embodiment, the reflection portion 21 and the invalid portion 22 may also form the step-shaped structure so that the height of the grill part 20 toward the front of the vehicle decreases as the grill part 20 moves away from the optical device 10.

Unlike the embodiment of FIG. 4, as shown in FIG. 5, when the reflection portion 21 and the invalid portion 22 form the step-shaped structure so that one end of one reflection portion 21 has a greater height of the invalid portion 22 toward the front of the vehicle than that of the other end of another reflection portion 21 as the grill part 20 is closer to the optical device 10, there is a concern that the outside air 40 flows along the grill part 20 and collides with the stepped invalid portion 22, thereby degrading the aerodynamic performance.

In addition, as shown in FIG. 5, when the reflection portion 21 and the invalid portion 22 form the step-shaped structure so that one end of one reflection portion 21 has a greater height of a protrusion toward the front of the vehicle than that of the other end of another reflection portion 21 as the grill part 20 is closer to the optical device 10, an area where the glare light 31 is incident may be present on the surface of the reflection portion 21 behind the invalid portion 22. A shadow area a may be generated between the area and the invalid portion 22. On the other hand, as in the embodiment shown in FIG. 4, when the reflection portion 21 and the invalid portion 22 form the step-shaped structure so that the height of the protrusion toward the front of the vehicle decreases as the grill part 20 is closer to the optical device 10, it is possible to prevent the shadow area a from being formed behind the invalid portion 22.

Figure 6:
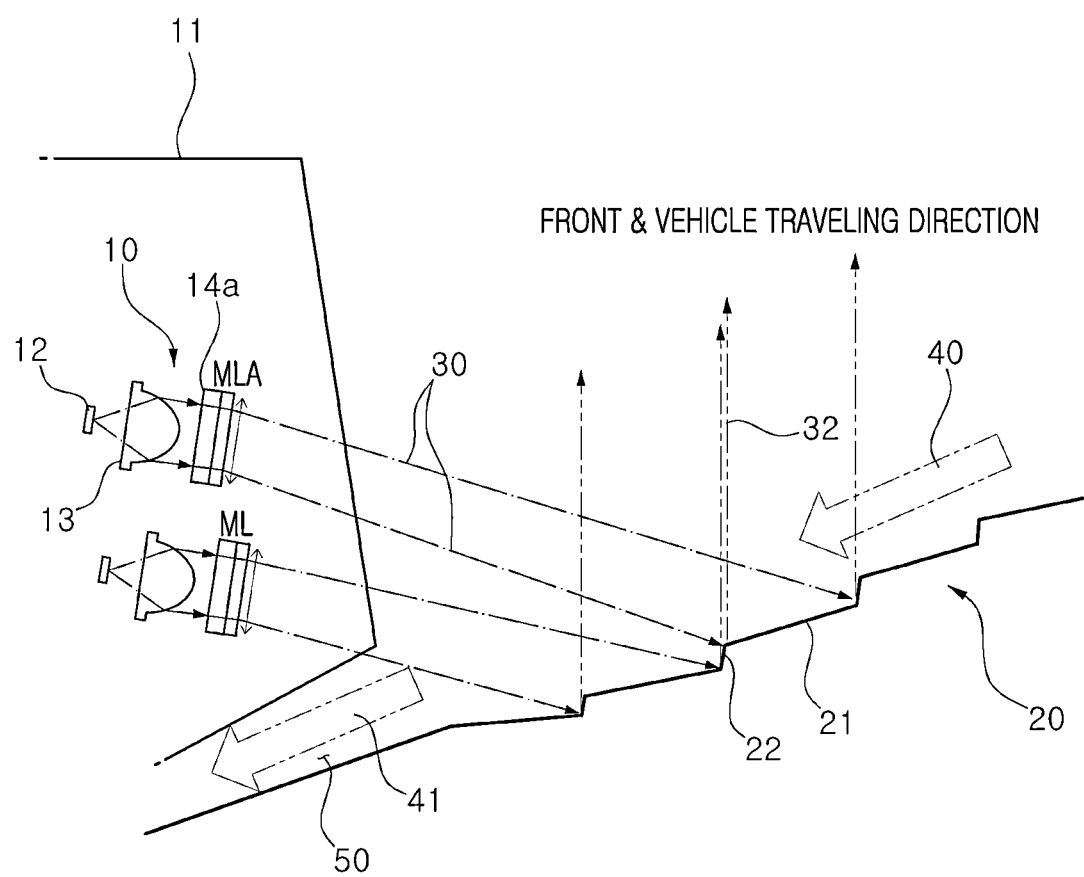
FIG. 6 is a cross-sectional view showing the grill lighting lamp system according to an embodiment of the present disclosure, the light reflection operation thereof, and the flow of the outside air on the grill.

FIG. 6 is a cross-sectional view showing the grill lighting lamp system according to an embodiment of the present disclosure, the light reflection operation thereof, and the flow of the outside air on the grill.

In the embodiment shown in FIG. 6, an opening 50 may be provided between the housing 11 in which the optical device 10 is arranged and the grill part 20. As shown in FIG. 6, the opening 50 may be configured in the form of a gap between the housing 11, including the optical device 10, and the grill part 20. The opening 50 may function as an aerodynamic hole for improving aerodynamics by directing the outside air 40 flowing along the grill part 20 toward the rear inside the vehicle. In addition, when the opening 50 is arranged so that the outside air 41 passing through the opening 50 is directed toward a battery side of an internal combustion engine or an electric vehicle, the opening 50 may function to improve the cooling performance by the outside air 41.

Although not shown in FIG. 6, the opening 50 through which the outside air 41 may pass may also be additionally formed in the invalid portion 22. When the grill part 20 is installed on the front of the vehicle, as described above, the invalid portion 22 may not interfere with the flow of the outside air 40 moving through the grill part 20, so that it is not necessary to install the opening in the invalid portion 22.

However, when the grill part 20 is mounted around the rear lamp on the rear of the vehicle and the air introduced through the front of the vehicle is introduced into a back surface of the grill part 20 through an air curtain, the outside air 40 may not pass through the grill part 20, thereby causing aerodynamic loss. Therefore, in this case, when the opening is formed in the invalid portion 22, the outside air 40 moving from the front of the vehicle to the back surface of the grill part 20 through the air curtain may be sent out to the rear of the vehicle through the opening of the invalid portion 22, thereby securing aerodynamic performance.

In the embodiment shown in FIG. 6, a micro lens array (MLA) 14a may be used as the emission-side lens 14 of the optical device 10. The micro lens array 14a may be a module in which a plurality of fine lenses is arranged and functions to refract parallel light so that the parallel light passing through the collimator lens 13 passes through the micro lens array 14a and becomes light having a specific pattern.

Figure 7:
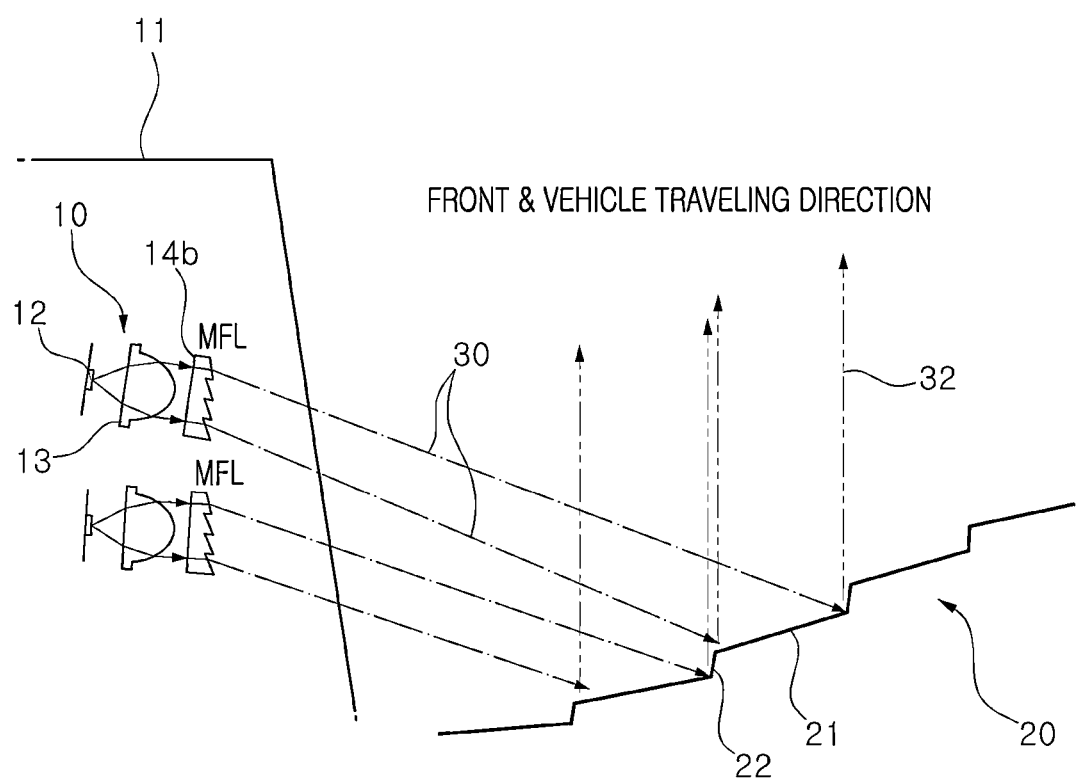
FIG. 7 is a cross-sectional view showing a grill lighting lamp system to which a multi-facet lens (MFL) is applied to an optical device and a light reflection operation thereof.

Unlike FIG. 6, FIG. 7 is a cross-sectional view showing a grill lighting lamp system to which a multi-facet lens (MFL) is applied to an optical device 10 and a light reflection operation thereof.

Since a light emitting diode (LED) has a very large radiation angle due to its characteristics, light efficiency may be greatly decreased due to an etendue problem when used for a function of irradiating a remote local area. Therefore, when the LED is used as the light source, it is possible to compensate for light efficiency by applying the MFL 14b which is a condensing lens configured to condense the light emitted from the LED or induce the light in a direction parallel to an optical axis.

Figure 8:
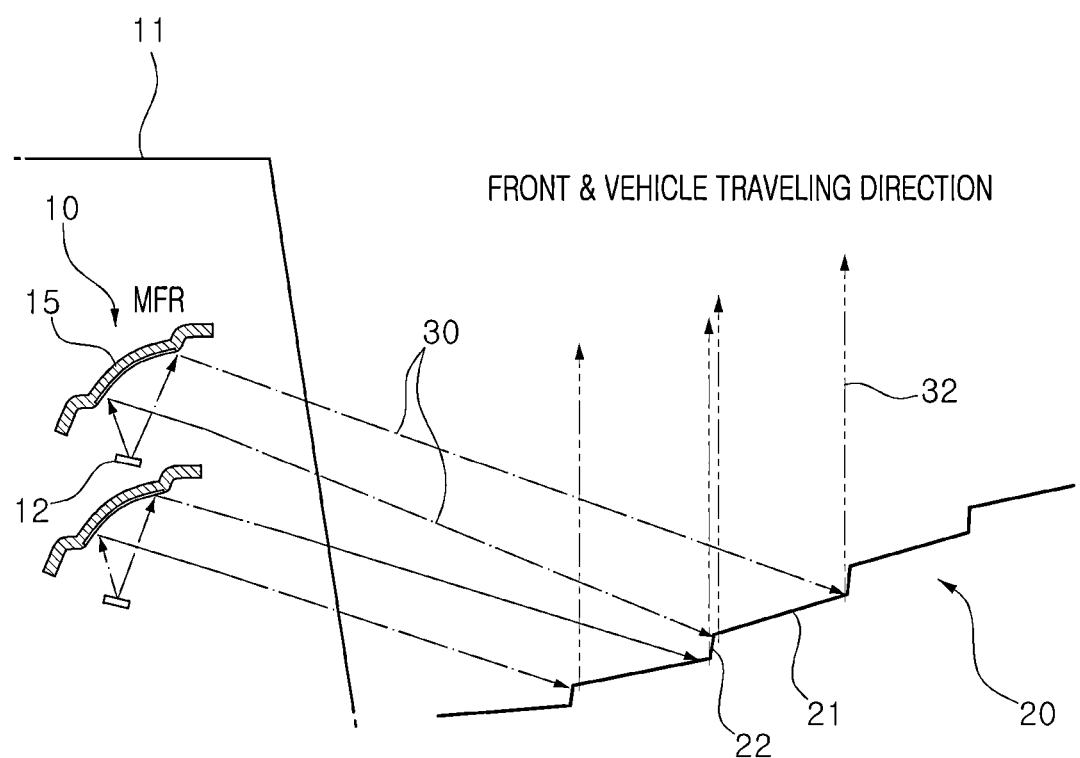
FIG. 8 is a cross-sectional view showing a grill lighting lamp system to which a multi-facet reflector (MFR) is applied to an optical device and a light reflection operation thereof.

FIG. 8 is a cross-sectional view showing a grill lighting lamp system to which a multi-facet reflector (MFR) is applied to an optical device 10 and a light reflection operation thereof.

In the example shown in FIG. 8, the light generated by the light source 12 may be irradiated toward the reflection portion 21 of the grill part 20 by being reflected through an MFR type reflector 15 in which a structure of a reflection plate is divided into a plurality of cells and changes a radius of curvature or focus of the reflection plate for each cell. A cut-off light distribution pattern may be formed using the MFR type reflector 15.

Figure 9:
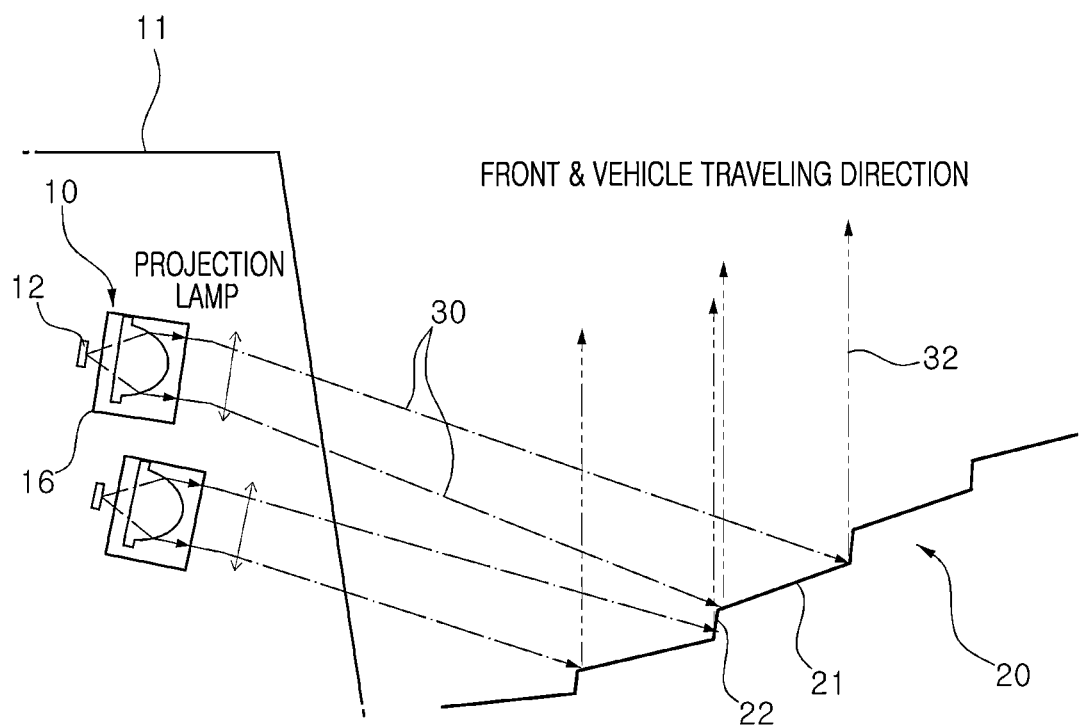
FIG. 9 is a cross-sectional view showing a grill lighting lamp system to which a projection lamp is applied as the optical device and a light reflection operation thereof.

FIG. 9 is a cross-sectional view showing a grill lighting lamp system to which a projection lamp 16 is applied as the optical device and a light reflection operation thereof.

In general, the projection lamp includes an elliptical reflector configured to reflect light from the light source 12, a lens installed on the front to diffuse the light reflected from the reflector, and a fan-shaped shield positioned between the reflector and the lens. When the projection lamp 16 is applied, the pattern of a final beam passing through the lens may be changed depending on the shape of the end of the shield.

Figure 10:
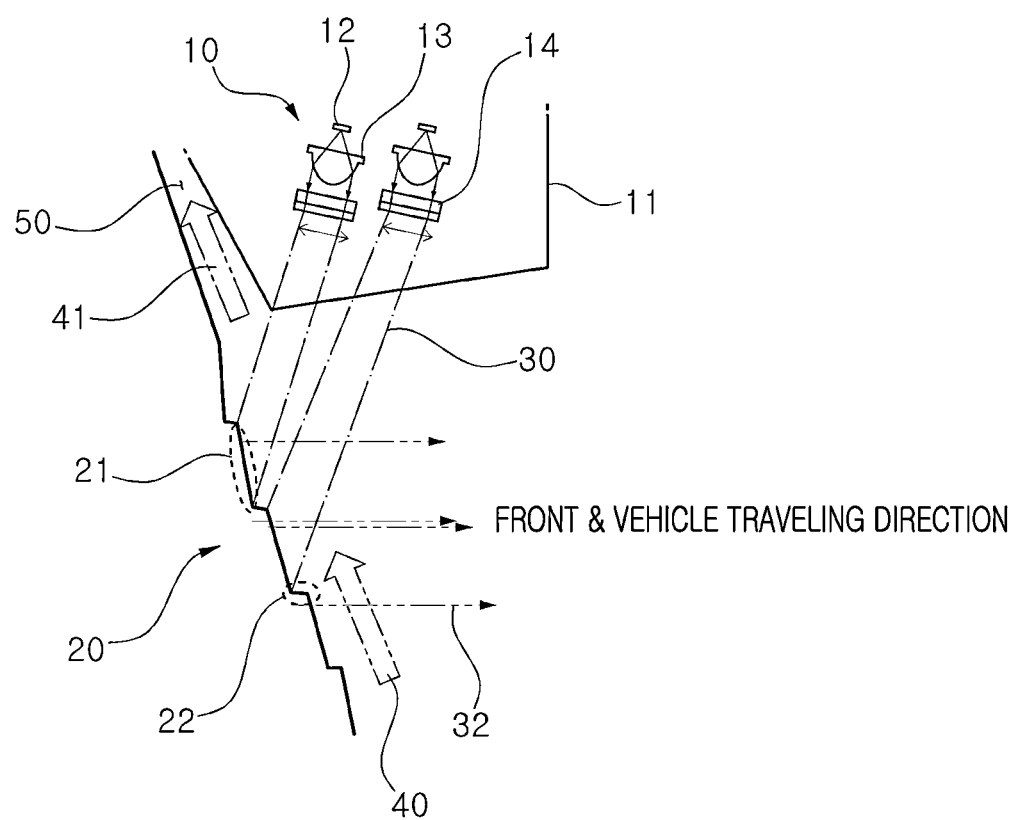
FIGS. 10 and 11 are cross-sectional views showing an arrangement structure of the optical device in the grill lighting lamp system according to an embodiment of the present disclosure.
Figure 11:
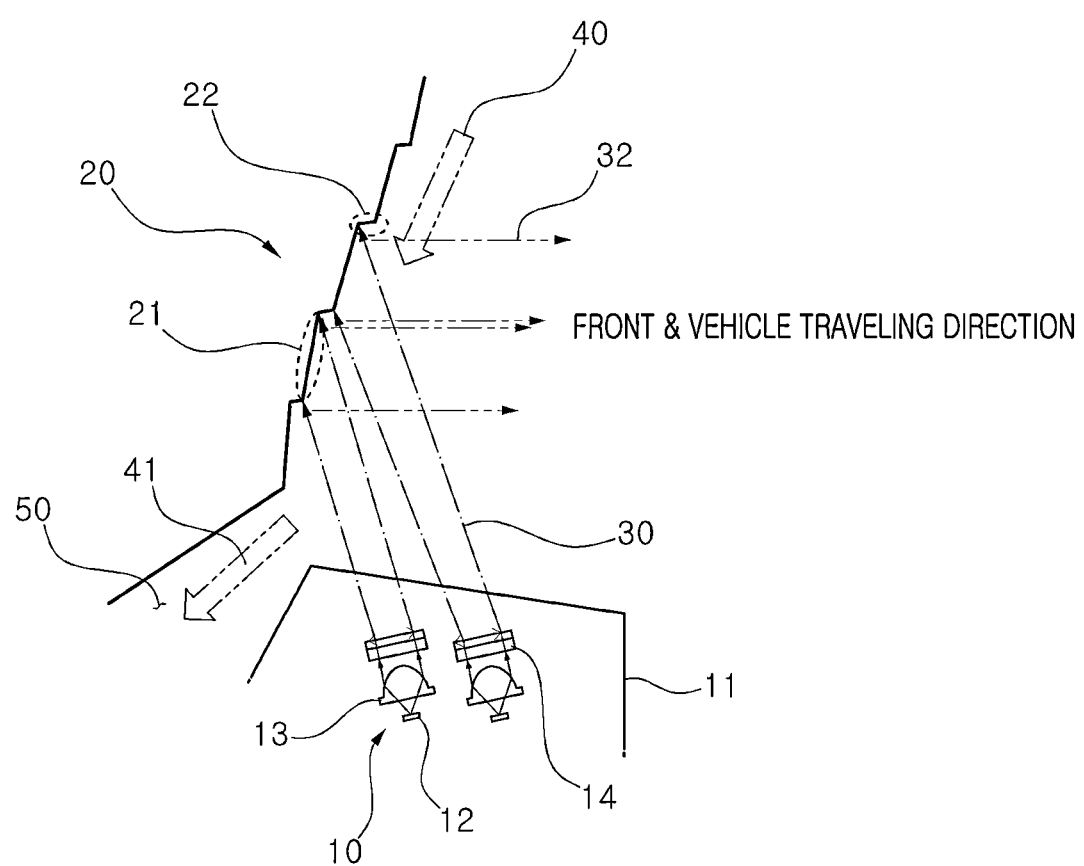

FIGS. 10 and 11 are cross-sectional views showing the arrangement structure of the optical device in the grill lighting lamp system according to an embodiment of the present disclosure.

In the example shown in FIG. 10, the optical device 10 may be arranged above the grill part 20. In this case, in consideration of aerodynamic performance, the opening 50 formed between the optical device 10 and the grill part 20 may extend toward the rear and top of the vehicle. Therefore, in the example shown in FIG. 10, the outside air 40 flowing along the grill part 20 may be induced to move toward the rear and top of the vehicle along the opening 50.

On the other hand, in the example shown in FIG. 11, the optical device 10 may be arranged below the grill part 20. In this case, likewise, in consideration of aerodynamic performance, the opening 50 formed between the optical device 10 and the grill part 20 may extend toward the rear and the bottom of the vehicle. Therefore, in the example shown in FIG. 11, the outside air 40 flowing along the grill part 20 may be guided to move toward the rear and top of the vehicle along the opening 50.

Therefore, it is advantageous to determine a relative position of the optical device 10 and the grill part 20 in consideration of the aerodynamic performance required for the vehicle, the position of the engine compartment cooled by the outside air 41 passing through the opening 50, and the like.

In addition, FIGS. 10 and 11 show that the optical device 10 is only positioned above or below the grill part 20, but the present disclosure is not limited thereto. For example, when the vehicle is viewed from the top, the optical device 10 may also be arranged side by side with the grill part 20.

Figure 12:
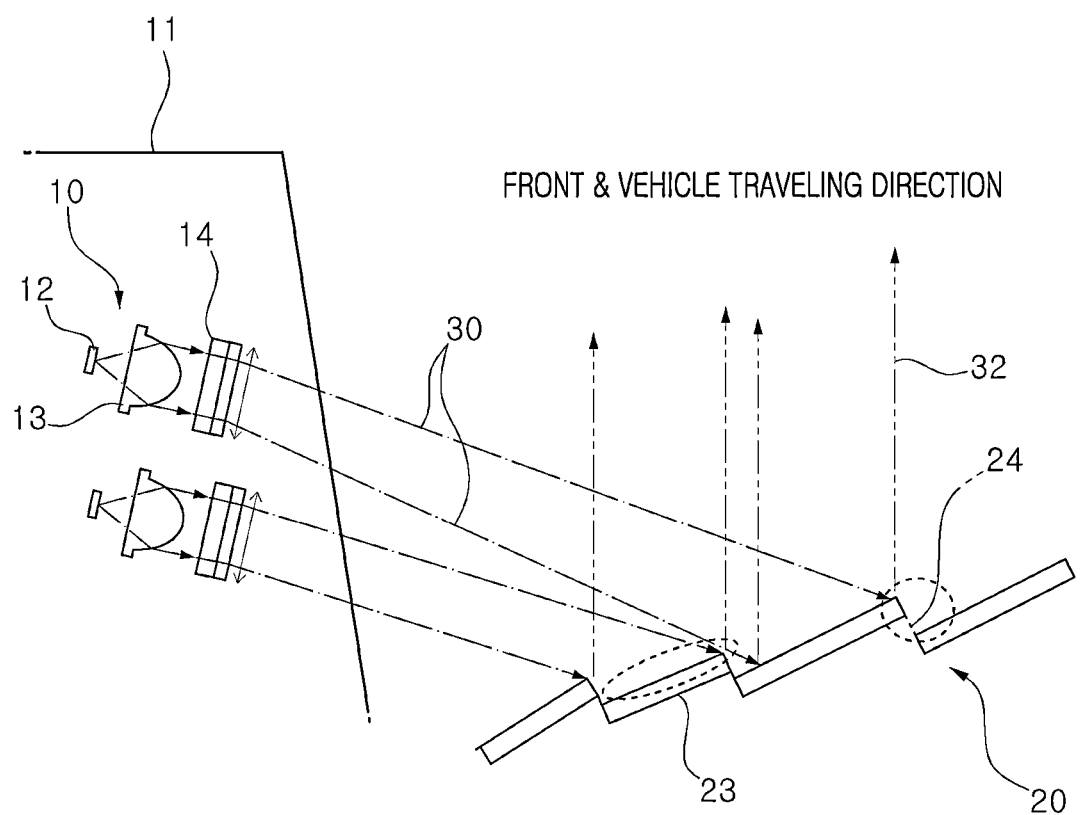
FIG. 12 is a cross-sectional view showing the grill lighting lamp system according to an embodiment of the present disclosure and a light reflection operation thereof.
Figure 13:
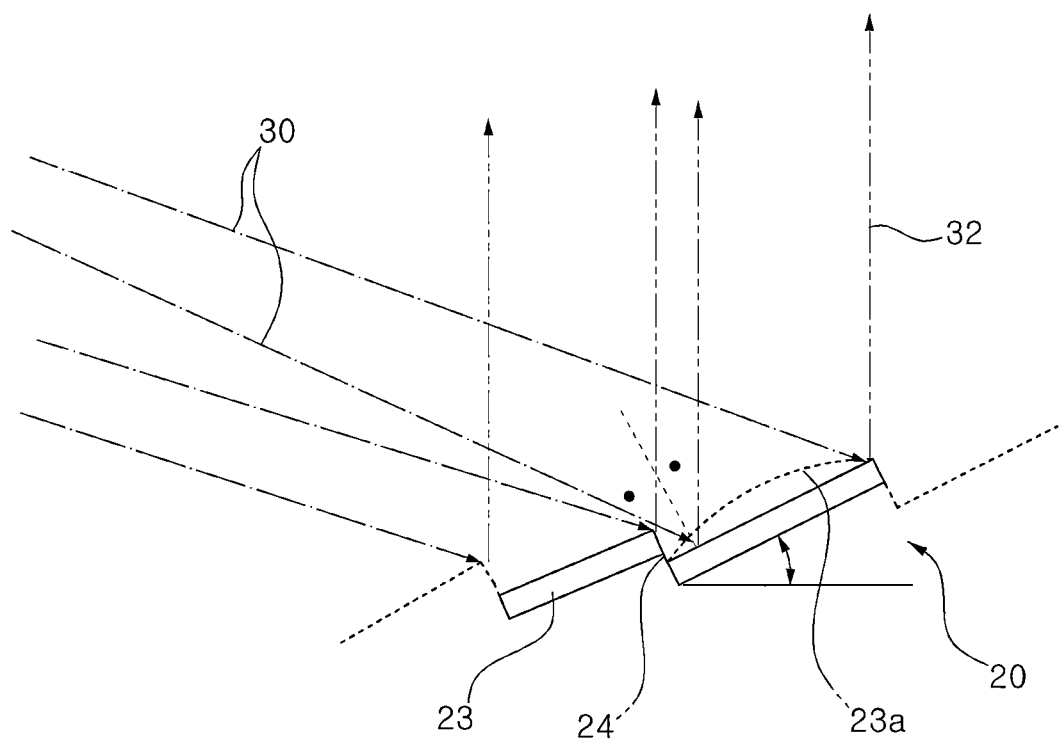
FIGS. 13 and 14 are cross-sectional views showing a grill constituting the grill lighting lamp system according to an embodiment of the present disclosure and a light reflection operation thereof.
Figure 14:
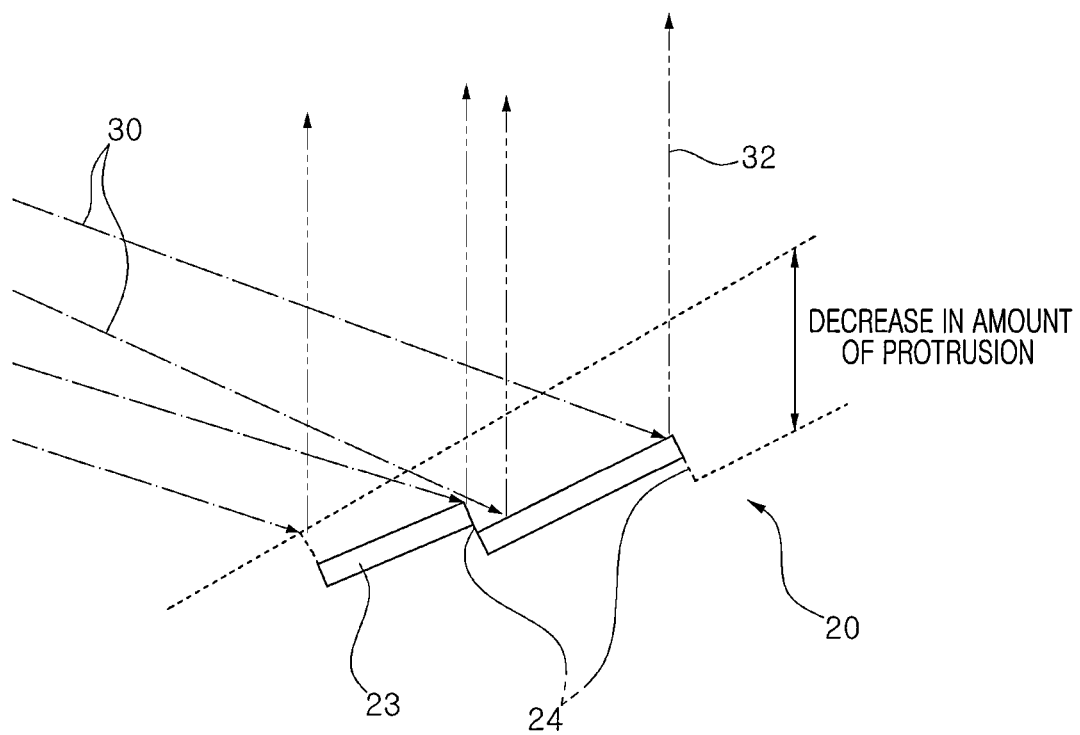

FIG. 12-14 are cross-sectional views showing a grill lighting lamp system according to an embodiment of the present disclosure different from that of FIG. 1 and a light reflection action thereof. The embodiment shown in FIG. 12 is different from the embodiment shown in FIG. 1 only in the structure of the grill part 20. Therefore, a description of the configuration overlapping that of FIG. 1 is omitted.

As described above, in the grill part 20 of the embodiment shown in FIG. 1, the reflection portion 21 and the portion 22 may form a step-shaped structure so that the height of the grill part 20 decreases as the grill part 20 is closer to the optical device 10. In this case, as shown in FIG. 1, the amount of protrusion of the grill part 20 may increase toward the front of the vehicle. Therefore, it may be difficult to apply the grill lighting lamp system shown in FIG. 1 due to a limited space in the front of the vehicle.

On the other hand, in the embodiment shown in FIG. 12, a reflection portion 23 and an invalid portion 24 may form a step-shaped structure so that one end of one reflection portion 23 has a greater height of a protrusion protruding toward the front of the vehicle than that of the other end of another reflection portion 23 as the grill part 20 is closer to the optical device 10. According to the structure, as shown in FIG. 14, it is possible to relatively decrease the amount of protrusion of the grill part 20 toward the front of the vehicle as compared to FIG. 1.

However, as described above, when the reflection portion 23 and the invalid portion 24 form the step-shaped structure so that one end of one reflection portion 23 has a greater height of a protrusion protruding toward the front of the vehicle than that of the other end of another reflection portion 23 as the grill part 20 is closer to the optical device 10, there is a concern that the shadow area a is generated by the invalid portion 24. Therefore, in order to minimize the shadow area a by the incident light 30 from the optical device 10 and reflect the reflected light 32 reflected by each reflection portion 23 toward the front of the vehicle in a predetermined lighting shape, each reflection portion 23 may be configured to be inclined at a predetermined angle with respect to each other. In addition, as shown in FIG. 13, it is beneficial to provide a convex portion 23a convex toward the front so that light may be diffusely reflected from the surface of the reflection portion 23.

Figure 15:
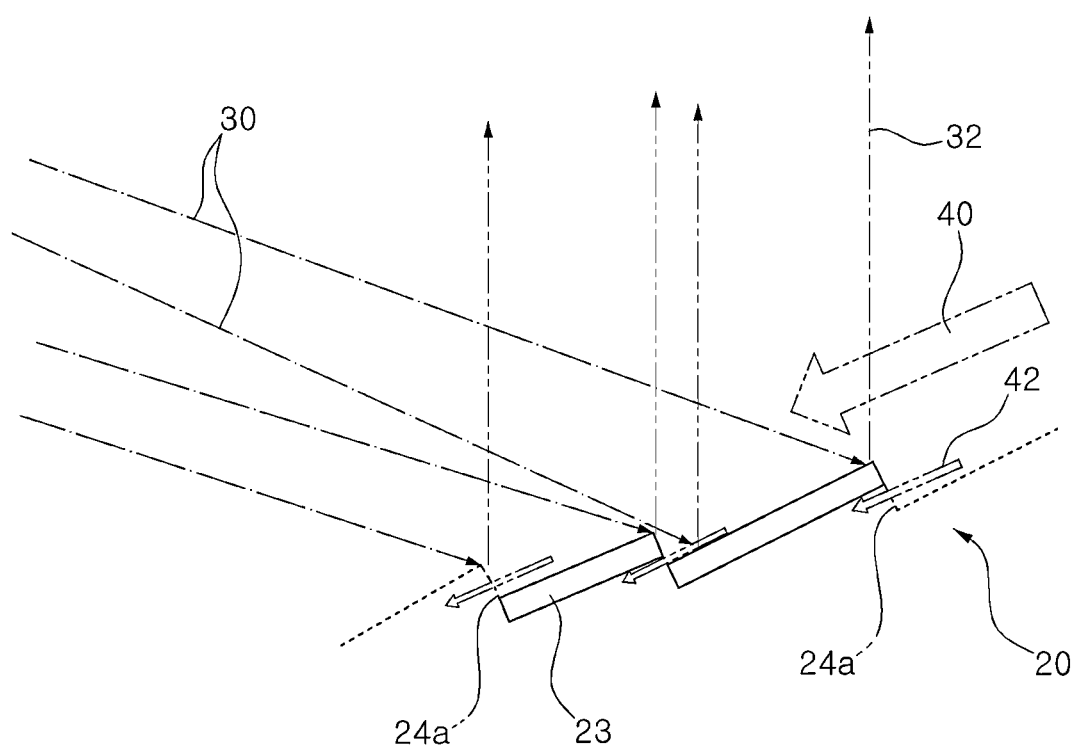
FIG. 15 is a cross-sectional view showing the flow of outside air on the grill of the grill lighting lamp system shown in FIG. 12.

Since the outside air 40 does not move toward the front of the grill part 20 when the vehicle normally travels when the grill part 20 is installed around the rear lamp on the rear of the vehicle, as shown in FIG. 15, problems related to aerodynamic performance or cooling performance may not occur even when the reflection portion 23 and the invalid portion 24 may form the step-shaped structure so that one end of one reflection portion 23 has a greater height of a protrusion protruding toward the front of the vehicle than that of the other end of another reflection portion 23 as the grill part 20 is closer to the optical device 10. However, when the grill part 20 is installed on the front surface of the vehicle and the outside air 40 flows toward the grill part 20 when the vehicle travels, the outside air 40 may move along the grill part 20 and collide with the invalid portion 24, so that there is a concern that the aerodynamic performance is decreased. Therefore, as shown in FIG. 15, in an embodiment of the present disclosure, an opening 24a through which outside air 42 passes may be formed in the invalid portion 24. In this case, the outside air 42 colliding with the invalid portion 24 among the outside air 40 flowing along the grill part 20 may pass through the opening 24a and may be discharged to the inside or outside of the vehicle, thereby preventing the aerodynamic performance from being decreased. In addition, although not shown in FIG. 15, as in the embodiments shown in FIGS. 10 and 11, when the opening 50 is further provided in the form of the gap between the optical device 10 and the grill part 20, it is possible to further compensate for the aerodynamic performance by discharging the outside air 40 not passing through 24a to the rear of the vehicle. Furthermore, the light may be blocked by the invalid portion 24 by providing the opening 24a passing through the invalid portion 24, thereby further preventing the shadow area a from being generated.

Figure 16:
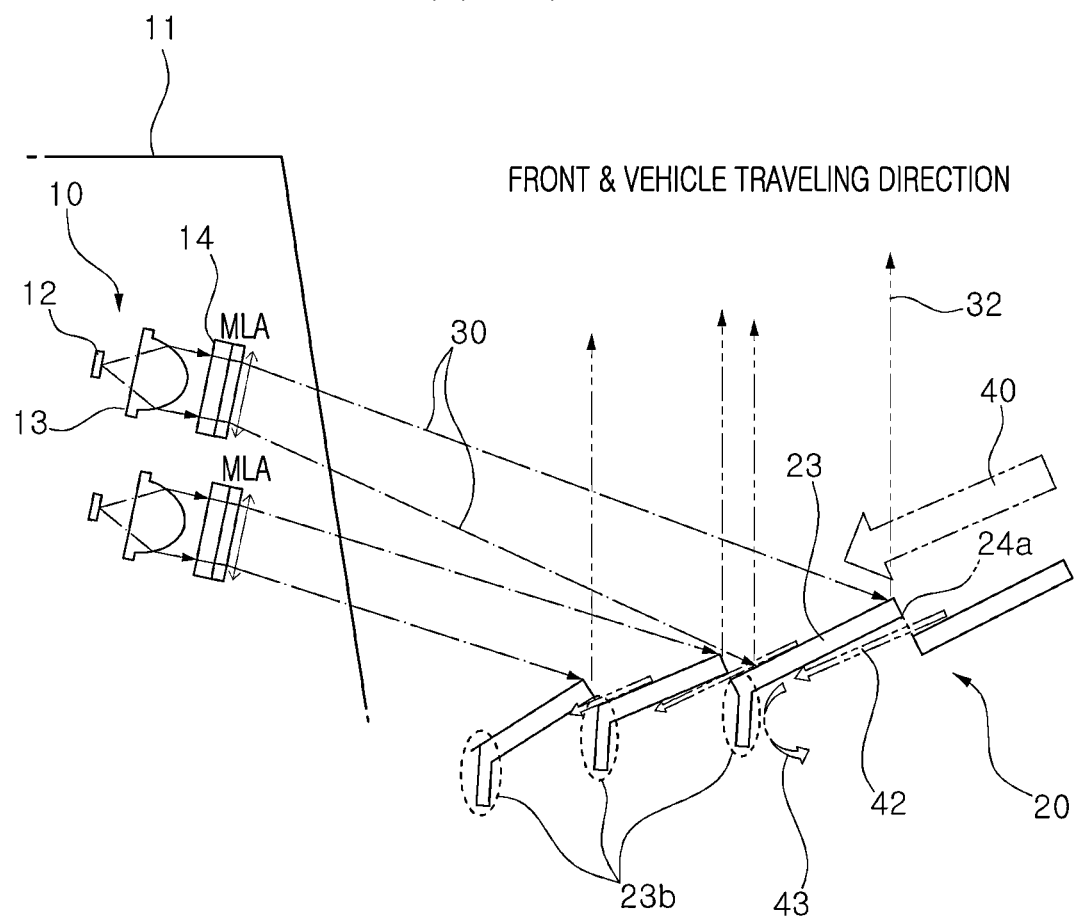
FIG. 16 is a cross-sectional view showing a grill lighting lamp system in which a micro lens array (MLA) is applied to the optical device, a light reflection operation thereof, and the flow of the outside air on the grill.

FIG. 16 is a cross-sectional view showing a grill lighting lamp system in which a micro lens array (MLA) is applied to the optical device, a light reflection operation thereof, and the flow of the outside air on the grill.

Referring to FIG. 16, the reflection portion 23 may further include a vortex generation portion 23b configured to form a vortex 43 in the outside air 42 introduced through the opening 24a formed in the invalid portion 24. For example, the invalid portion 24 formed with the opening 24a may be arranged at one end of the reflection portion 23 in the longitudinal direction, and the vortex generation portion 23b may be provided at the other end of the reflection portion 23 in the longitudinal direction. In this case, the vortex generation portion 23b may be in the form of an extension which extends by being bent to the inside of the reflection portion 23 at a predetermined angle from the other end of the reflection portion 23 in the longitudinal direction. In this case, the outside air 42 introduced through the opening 24a formed in the invalid portion 24 may collide with the vortex generation portion 23b and the flow direction may be rapidly changed, so that the vortex 43 is formed. When an element requiring cooling, such as an engine compartment or a battery for an electric vehicle, is arranged behind the grill part 20, the reflection portion 23 may further include the vortex generation portion 23b, so that it is possible to further increase the cooling efficiency thereof. In addition, since the vortex generation portion 23b may perform a function of a reinforcement rib configured to reinforce the strength of the grill part 20, an effect of increasing the overall stiffness of the grill part 20 can be expected.

Figure 17:
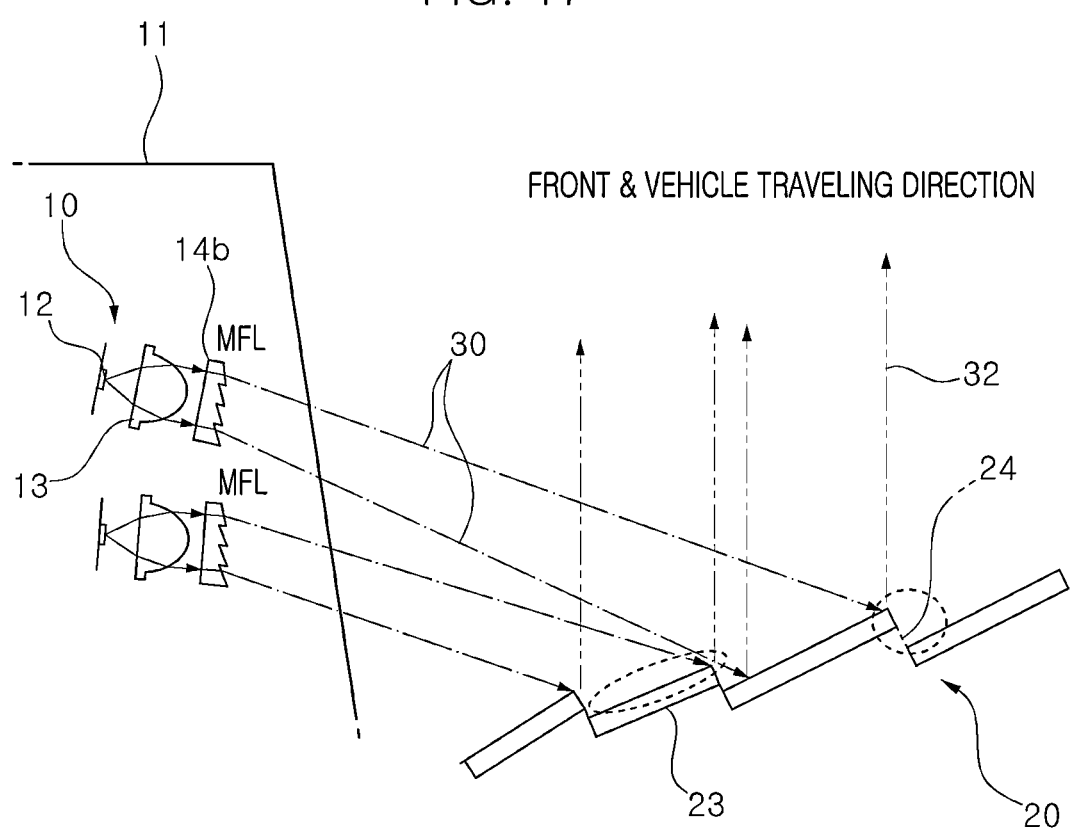
FIG. 17 is a cross-sectional view showing a grill lighting lamp system to which the MFL is applied to an optical device and a light reflection operation thereof.
Figure 18:
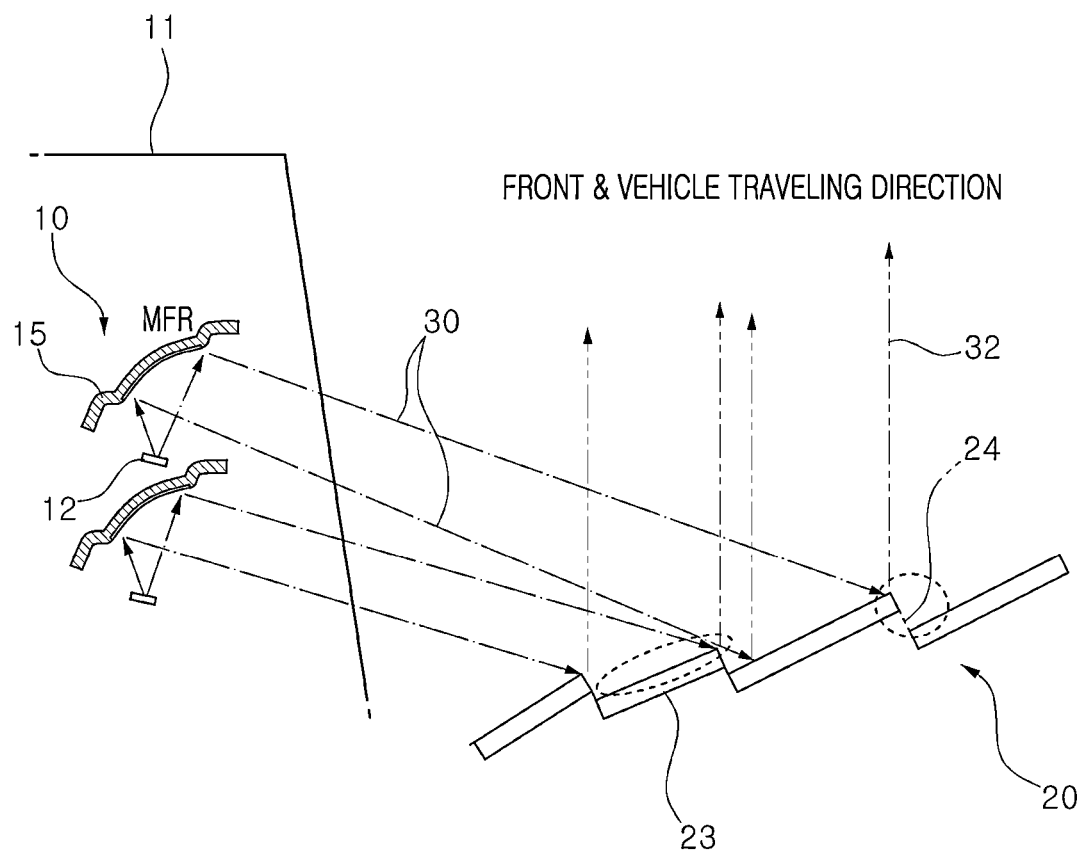
FIG. 18 is a cross-sectional view showing the grill lighting lamp system to which the MFR is applied to the optical device and the light reflection operation thereof.
Figure 19:
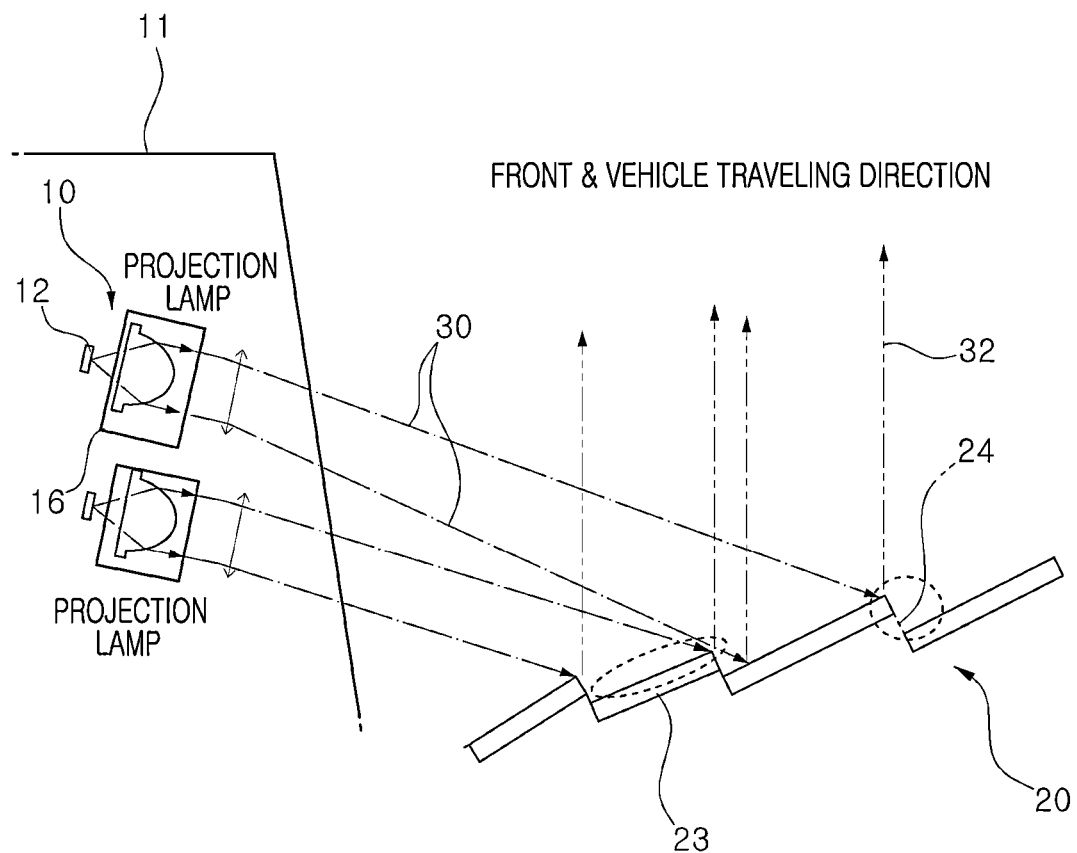
FIG. 19 is a cross-sectional view showing the grill lighting lamp system to which the projection lamp is applied as the optical device and the light reflection operation thereof.

In the embodiment shown in FIG. 16, the MLA 14a may be used as the emission-side lens 14 of the optical device 10. However, as described above, the present disclosure is not limited to the above example, and as shown in FIG. 17, the MFL 14b may also be used as the emission-side lens 14. In addition, as shown in FIG. 18, an optical system configured to reflect the light from the light source 12 to the reflection portion 23 through the MFR type reflector 15 may also be adopted, and as shown in FIG. 19, the projection lamp 16 may also be adopted as the optical system of the optical device 10.

Figure 20:
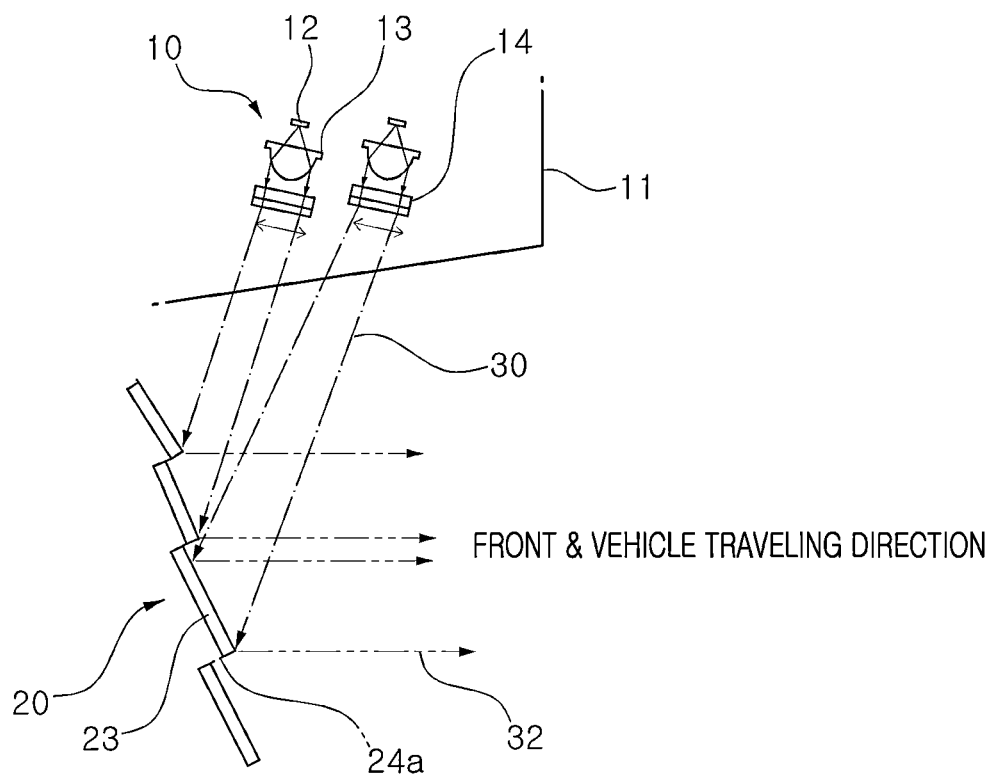
FIGS. 20 and 21 are cross-sectional views showing the arrangement structure of the optical device in the grill lighting lamp system according to an embodiment of the present disclosure.
Figure 21:
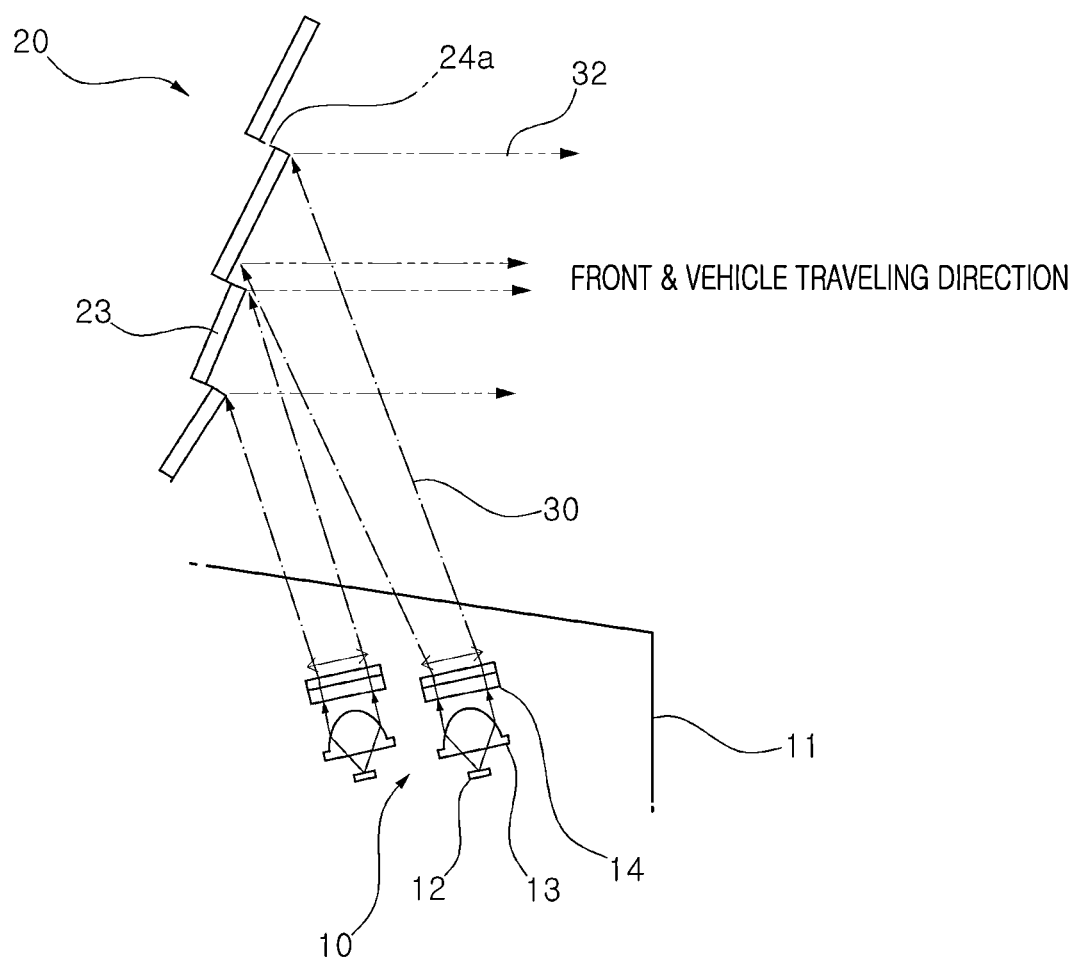

FIGS. 20 and 21 are cross-sectional views showing the arrangement structure of the optical device in the grill lighting lamp system according to an embodiment of the present disclosure.

In the example shown in FIG. 20, the optical device 10 may be disposed above the grill part 20. In this case, in consideration of the aerodynamic performance, the opening 24a formed in the invalid portion 24 may be opened toward the rear and top of the vehicle. Therefore, in the example shown in FIG. 20, the outside air flowing along the grill part 20 may be guided to move toward the rear and top of the vehicle along the opening 24a.

On the other hand, in the example shown in FIG. 21, the optical device 10 may be arranged below the grill part 20. In this case, likewise, in consideration of the aerodynamic performance, the opening 24a formed in the invalid portion 24 may be opened toward the rear and bottom of the vehicle. Therefore, in the example shown in FIG. 21, the outside air flowing along the grill part 20 may be induced to move toward the rear and bottom of the vehicle along the opening 24a.

In addition, although not shown in FIGS. 20 and 21, an additional opening may be formed between the optical device 10 and the grill part 20, and the vortex generation portion 23b may be formed on the one end of the reflection portion 23 to improve cooling performance.

Therefore, it is advantageous to determine the relative position of the optical device 10 and the grill part 20 in consideration of the aerodynamic performance required for the vehicle, the position of the engine compartment cooled by the outside air passing through the opening 24a, and the like.

The above description is merely illustrative of the technical spirit of the present disclosure, and various modifications and variations are possible by those having ordinary skill in the art to which the present disclosure pertains without departing from the essential characteristics of the present disclosure.

Therefore, the embodiments disclosed in the present disclosure are not intended to limit the technical spirit of the present disclosure but to describe it, and the scope of the technical spirit of the present disclosure is not limited by these embodiments. The scope of the present disclosure should be construed by the appended claims, and all technical spirits within the scope equivalent thereto should be construed as being included in the scope of the present disclosure.

What is claimed is:

1. A grill lighting lamp system comprising:
   a grill part provided in a vehicle; and
   an optical device configured to irradiate light to the grill part,
   wherein the grill part includes a plurality of reflection portions configured to reflect the light irradiated from the optical device toward outside of the vehicle, and
   an invalid portion provided in a stepped shape between the plurality of reflection portions and configured to absorb glare light not reflected forward among light incident on the reflection portion from the optical device.

2. The grill lighting lamp system of claim 1, wherein the grill part has the reflection portion and the invalid portion in the form of a step-shaped structure so that a height of the grill part to a front of the vehicle decreases as the grill part is closer to the optical device.

3. The grill lighting lamp system of claim 2, wherein the invalid portion is formed with a first opening so that outside air introduced toward the grill part from outside of the vehicle passes through the grill part and is introduced toward an inside of the vehicle.

4. The grill lighting lamp system of claim 3, wherein a second opening configured to guide outside air introduced toward the grill part from outside of the vehicle to be introduced toward an inside of the vehicle is formed between the optical device and the grill part.

5. The grill lighting lamp system of claim 3, further comprising a vortex generation portion extending toward a rear of the vehicle from the reflection portion so that a vortex is generated in the outside air introduced through the first opening formed in the invalid portion.

6. The grill lighting lamp system of claim 2, wherein the invalid portion is formed to be inclined at about 3° or more with respect to a direction in which light reflected by the reflection portion is directed.

7. The grill lighting lamp system of claim 2, wherein the grill part is formed to be inclined toward a rear of the vehicle from the front of the vehicle.

8. The grill lighting lamp system of claim 2, wherein the optical device is arranged above or below the grill part when viewing the vehicle from a side of the vehicle.

9. The grill lighting lamp system of claim 2, wherein a reflected surface of the reflection portion is configured in a chromatic color having a predetermined brightness or more or configured in an achromatic color to reflect the light.

10. The grill lighting lamp system of claim 2, wherein a reflected surface of the reflection portion is formed as a non-linear surface to diffusely reflect the light from the surface.

11. The grill lighting lamp system of claim 2, wherein the optical device includes a light source configured to generate and emit light and a micro lens array (MLA) module provided on a front of the light source in a light irradiation direction and on which the light is incident.

12. The grill lighting lamp system of claim 2, wherein the optical device includes a light source configured to generate and emit light and a multi-facet lens (MFL) provided on a front of the light source in a light irradiation direction and on which the light is incident.

13. The grill lighting lamp system of claim 2, wherein the optical device includes a light source configured to generate and emit light and a multi-facet reflector (MFR) configured to reflect the light irradiated from the light source and irradiate the reflected light to the grill part.

14. The grill lighting lamp system of claim 2, wherein the optical device is a projection lamp.

15. The grill lighting lamp system of claim 2, wherein an amount or color of light from the optical device is set depending on a color of a reflected surface of the reflection portion of the grill part.

16. The grill lighting lamp system of claim 1, wherein as the reflection portion and the invalid portion form a step-shaped structure so that a height of the invalid portion to a front of the vehicle decreases as the grill part moves away from the optical device.

17. A grill lighting lamp system comprising:
   a grill part provided in a vehicle; and an optical device configured to irradiate light to the grill part, wherein the grill part includes a plurality of reflection portions configured to reflect the light irradiated from the optical device toward an outside of the vehicle, and an invalid portion provided in a stepped shape between the plurality of reflection portions and configured to absorb glare light not reflected forward among light incident on the reflection portion from the optical device, wherein each reflection portion among the plurality of reflection portions is arranged to be inclined at a predetermined angle with respect to each other, and wherein the reflection portion and the invalid portion form a step-shaped structure so that one end of one reflection portion has a greater height of the invalid portion toward a front of the vehicle than that of another end of another reflection portion.

18. The grill lighting lamp system of claim 17, wherein the invalid portion is formed with a first opening so that outside air introduced toward the grill part from outside of the vehicle passes through the grill part and is introduced toward an inside of the vehicle.

19. The grill lighting lamp system of claim 18, wherein a second opening configured to guide the outside air introduced toward the grill part from outside of the vehicle to be introduced toward the inside of the vehicle is formed between the optical device and the grill part.

20. The grill lighting lamp system of claim 19, wherein the one end of the reflection portion is provided with a vortex generation portion extending toward a rear of the vehicle from the reflection portion so that a vortex is generated in the outside air introduced through the third opening formed in the invalid portion.

* * * * *